W. S. MOODY.
TRANSFORMER.
APPLICATION FILED MAR. 2, 1910.

1,057,077.

Patented Mar. 25, 1913.

Witnesses:
Earl G. Klock.
J. Ellis Glen.

Inventor:
Walter S. Moody,
by Albert G. Davis
His Attorney.

UNITED STATES PATENT OFFICE.

WALTER S. MOODY, OF PITTSFIELD, MASSACHUSETTS, ASSIGNOR TO GENERAL ELECTRIC COMPANY, A CORPORATION OF NEW YORK.

TRANSFORMER.

1,057,077.   Specification of Letters Patent.   Patented Mar. 25, 1913.

Application filed March 2, 1910. Serial No. 546,946.

*To all whom it may concern:*

Be it known that I, WALTER S. MOODY, a citizen of the United States, residing at Pittsfield, in the county of Berkshire, State of Massachusetts, have invented certain new and useful Improvements in Transformers, of which the following is a specification.

My invention relates to electric transformers, and has for its object an improvement in the connections of such devices.

More specifically my invention relates to electric transformers which are provided with intermediate taps upon one or both of the windings in order to operate the transformer through a range of different voltages.

I am aware that it is customary to operate transformers with taps brought out intermediate the extremities of either or both windings, and connect the incoming or outgoing circuits across the entire winding or only a portion thereof by the use of the taps of the winding. Such connections are used to obtain a desired regulation or change of voltage. While such an arrangement is perfectly satisfactory if great changes in voltage are not desired, if it be wished, for example, to operate a transformer with its primary connected to a supply circuit of constant potential and to have the voltage of its secondary vary through a wide range, it may occur that the portion of the primary winding which is not connected to the supply circuit may be much greater than the portion which is so connected, and thus an exceedingly high voltage will be induced across the primary winding.

The object of my invention is to prevent the occurrence of this voltage in a transformer such as I have described, and I accomplish this object by dividing one or both of the windings into disconnected portions or groups of sections formed by the taps connected to the winding, and connecting these groups of sections together in series when it is desired to have the full voltage across the entire winding, gradually cutting out the sections for a change in voltage, and, after cutting out such sections as may constitute a group, disconnecting this group from the rest of the winding. By this means I break up the winding into a number of different portions or groups, across each of which there will be a voltage of such limited amount as may be desirable.

For a further understanding of my invention reference may be had to the accompanying drawing, where—

Figure 1:
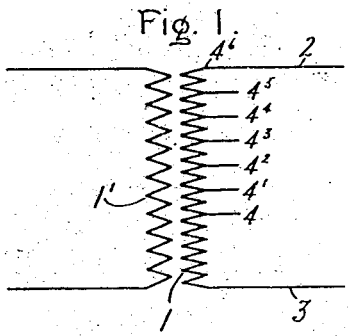
Figure 2:
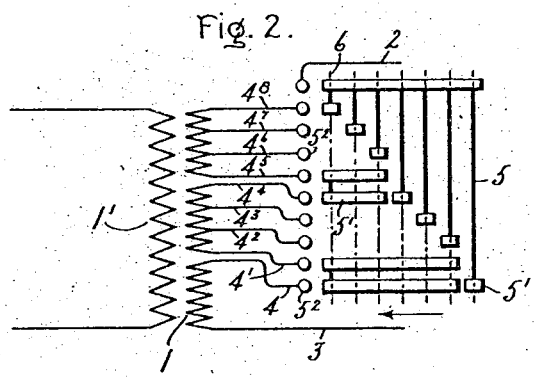

Figure 1 shows diagrammatically a transformer having a number of taps and not provided with my invention; Fig. 2 shows a transformer provided with my invention; and Fig. 3 shows a modification of Fig. 2.

Referring first to Fig. 1, 1 is the winding of a transformer connected to conductors 2 and 3, which may be supply conductors, and having taps 4, 4', 4², etc. 1' is the second winding of the transformer that may be connected to suitable translating devices. If it be desired to change the ratio of transformation, conductor 2 may be connected to taps 4⁵, 4⁴, etc., in the usual manner. It will be obvious that, if the portion of the winding tap 4 and conductor 3 is only a fraction of the entire winding, the voltage induced between tap 4 and end connection 4⁶ will be much higher than the impressed voltage between conductors 3 and 3 when conductor 2 is connected to tap 4, and this may be a source of considerable danger to the insulation of the transformer. In order to avoid this danger, I break up the winding into disconnected groups of several sections, as shown in Fig. 2.

In Fig. 2 I have shown a switching device 5 consisting of movable contact members 5', and stationary contact members 5² connected to the taps and conductor 2, which switching device, for the purpose of clearness of illustration, is shown diagrammatically, but it is obvious that any of the well known and usual devices may be used. If the switching device be moved in the direction of the arrow, it will be seen that for the first position of the device, as shown by dotted line 6, conductor 2 is connected across the entire winding 1 of the transformer and the disconnected groups of sections are connected together in series. Subsequent positions of the switching device are denoted by the subsequent dotted lines, conductor 2 being connected to the various taps for these positions. After conductor 2 has been connected to tap 4⁶, the next movement of the switch disconnects the group of sections between taps 4⁵, 4⁶, 4⁷ and 4⁸ from the remainder of the winding and connects conductor 2 to tap 4⁴. It will thus be obvious that the winding is broken up into a number of groups or portions, across each of which the induced voltage may be kept to a desirable limit by a suitable design of the transformer.

Figure 3:
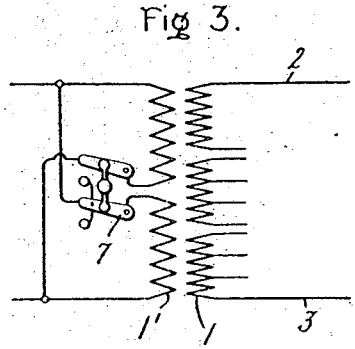

In Fig. 3 I have shown the same arrangement as shown in Fig. 2, the switching device not being shown. The winding of the transformer not provided with taps being provided with a switch 7, and suitable connections for series or parallel connection. By this arrangement I am able to obtain, as it is obvious, a range of voltage greater than that possible with the connections shown in Fig. 2. It is further obvious that my invention may be applied to either or both transformer windings.

While I have illustrated my invention as applied to a particular arrangement of connections, I do not limit myself to this arrangement, but seek in the appended claims to cover all arrangements which are obvious to those skilled in the art and do not depart from the spirit of my invention.

What I claim as new and desire to secure by Letters Patent of the United States, is—

1. The combination with a transformer having a winding divided into groups, of a switching means arranged in one of its positions to connect said groups to the mains and in series with each other, and in another of its positions to connect a smaller number of said groups to said mains and to disconnect the other group or groups from the remainder of the winding.

2. The combination with a transformer having a winding divided into groups, of a switching means arranged in one of its positions to connect said groups to the mains and in series with each other, and in another of its positions to connect a smaller number of said groups to said mains and to disconnect the other groups from each other and the remainder of the winding.

In witness whereof, I have hereunto set my hand this 21st day of February, 1910.

WALTER S. MOODY.

Witnesses:
 CHAS. R. BLAKELY,
 JAS. A. O'NEILL.

age may be kept to a desirable limit by a suitable design of the transformer.

In Fig. 3 I have shown the same arrangement as shown in Fig. 2, the switching device not being shown. The winding of the transformer not provided with taps being provided with a switch 7, and suitable connections for series or parallel connection. By this arrangement I am able to obtain, as it is obvious, a range of voltage greater than that possible with the connections shown in Fig. 2. It is further obvious that my invention may be applied to either or both transformer windings.

While I have illustrated my invention as applied to a particular arrangement of connections, I do not limit myself to this arrangement, but seek in the appended claims to cover all arrangements which are obvious to those skilled in the art and do not depart from the spirit of my invention.

What I claim as new and desire to secure by Letters Patent of the United States, is—

1. The combination with a transformer having a winding divided into groups, of a switching means arranged in one of its positions to connect said groups to the mains and in series with each other, and in another of its positions to connect a smaller number of said groups to said mains and to disconnect the other group or groups from the remainder of the winding.

2. The combination with a transformer having a winding divided into groups, of a switching means arranged in one of its positions to connect said groups to the mains and in series with each other, and in another of its positions to connect a smaller number of said groups to said mains and to disconnect the other groups from each other and the remainder of the winding.

In witness whereof, I have hereunto set my hand this 21st day of February, 1910.

WALTER S. MOODY.

Witnesses:
CHAS. R. BLAKELY,
JAS. A. O'NEILL.

---

It is hereby certified that in Letters Patent No. 1,057,077, granted March 25, 1913, upon the application of Walter S. Moody, of Pittsfield, Massachusetts, for an improvement in "Transformers," an error appears in the printed specification requiring correction as follows: Page 1, line 78, first occurrence, for the reference-numeral "3" read 2; and that the said Letters Patent should be read with this correction therein, that the same may conform to the record of the case in the Patent Office.

Signed and sealed this 6th day of May, A. D., 1913.

[SEAL.]

C. C. BILLINGS,
*Acting Commissioner of Patents.*

It is hereby certified that in Letters Patent No. 1,057,077, granted March 25, 1913, upon the application of Walter S. Moody, of Pittsfield, Massachusetts, for an improvement in "Transformers," an error appears in the printed specification requiring correction as follows: Page 1, line 78, first occurrence, for the reference-numeral "3" read *2*; and that the said Letters Patent should be read with this correction therein, that the same may conform to the record of the case in the Patent Office.

Signed and sealed this 6th day of May, A. D., 1913.

[SEAL.]

C. C. BILLINGS,
*Acting Commissioner of Patents.*